United States Patent
Yoshida et al.

(10) Patent No.: US 11,168,210 B2
(45) Date of Patent: Nov. 9, 2021

(54) RESIN COMPOSITION

(71) Applicant: DAIKIN INDUSTRIES, LTD., Osaka (JP)

(72) Inventors: Ken Yoshida, Osaka (JP); Hirokazu Yukawa, Osaka (JP); Keisuke Hagi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/057,196

(22) PCT Filed: May 15, 2019

(86) PCT No.: PCT/JP2019/019299
§ 371 (c)(1),
(2) Date: Nov. 20, 2020

(87) PCT Pub. No.: WO2019/225435
PCT Pub. Date: Nov. 28, 2019

(65) Prior Publication Data
US 2021/0206968 A1    Jul. 8, 2021

(30) Foreign Application Priority Data
May 22, 2018   (JP) .............................. JP2018-097928

(51) Int. Cl.
*C08L 71/08* (2006.01)
*C08L 27/18* (2006.01)
*C08K 3/04* (2006.01)
*C08K 7/04* (2006.01)

(52) U.S. Cl.
CPC .............. *C08L 71/08* (2013.01); *C08K 3/042* (2017.05); *C08K 7/04* (2013.01); *C08L 27/18* (2013.01)

(58) Field of Classification Search
CPC ..... C08K 7/04; C08K 3/04; C08K 7/06; C08J 5/04; C08L 101/12
See application file for complete search history.

(56) References Cited

U.S. PATENT DOCUMENTS

| | | | |
|---|---|---|---|
| 5,438,104 A | 8/1995 | Kishi et al. | |
| 5,604,285 A | 2/1997 | Miyamori et al. | |
| 6,020,417 A | 2/2000 | Umemoto et al. | |
| 2009/0227723 A1 | 9/2009 | Kaya et al. | |
| 2013/0143117 A1 | 6/2013 | Koh et al. | |
| 2017/0362526 A1 | 12/2017 | Matsumoto | |

FOREIGN PATENT DOCUMENTS

| | | | |
|---|---|---|---|
| JP | 51-126241 A | 11/1976 | |
| JP | 56-34020 B2 | 8/1981 | |
| JP | 58-74739 A | 5/1983 | |
| JP | 60-18696 B2 | 5/1985 | |
| JP | 2-251599 A | 10/1990 | |
| JP | 5-255564 A | 10/1993 | |
| JP | 5-320455 A | 12/1993 | |
| JP | 7-11088 A | 1/1995 | |
| JP | 7-290582 A | 11/1995 | |
| JP | 9-194626 A | 7/1997 | |
| JP | H-09194626 A | * | 7/1997 |
| JP | 10-254199 A | 9/1998 | |
| JP | 2000-136310 A | 5/2000 | |
| JP | 2002-128981 A | 5/2002 | |
| JP | 2002-317089 A | 10/2002 | |
| JP | 2003-41083 A | 2/2003 | |
| JP | 2006-176544 A | 7/2006 | |
| JP | 2007-023230 A | * | 2/2007 |
| JP | 2007-186676 A | 7/2007 | |
| JP | 2008-208159 A | 9/2008 | |
| JP | 2010-216612 A | 9/2010 | |
| JP | 2011-184827 A | 9/2011 | |
| JP | 2011-526948 A | 10/2011 | |
| JP | 2012-84523 A | 4/2012 | |
| WO | 2007/055338 A1 | 5/2007 | |
| WO | 2010/002592 A1 | 1/2010 | |
| WO | 2016/114244 A1 | 7/2016 | |
| WO | 2018/096908 A1 | 5/2018 | |

OTHER PUBLICATIONS

Written Opinion dated Nov. 28, 2019 in related Japanese Application No. 2018-097927.
Written Request for Appeal dated Apr. 8, 2020 in related Japanese Application No. 2018-097927.
International Preliminary Report on Patentability with translation of Written Opinion dated Nov. 24, 2020, in International Application No. PCT/JP2019/019299.
International Preliminary Report on Patentability with translation of Written Opinion dated Nov. 24, 2020, in related International Application No. PCT/JP2019/019295.
International Appln. No. PCT/JP2019/019295, Ken Yoshida et al., filed May 15, 2019.
International Search Report dated Jul. 9, 2019 in International Application No. PCT/JP2019/019299.
Sogabe et al., "The Present and Future of Pitch-based Carbon Fibers", Proceedings of the 31st Composite Material Seminar, Feb. 26, 2018 (11 pages total).
International Search Report dated Aug. 6, 2019 in International Application No. PCT/JP2019/019295.
Communication (Decision to Grant a Patent) dated Dec. 10, 2019 in Japanese Application No. 2019-091986.

* cited by examiner

*Primary Examiner* — Robert D Harlan
(74) *Attorney, Agent, or Firm* — Sughrue Mion, PLLC

(57) ABSTRACT

A resin composition containing a crystalline resin having a melting point of 290° C. or higher, a graphite yarn (A) having a crystallite size in a c-axis direction of not greater than 30.0 Å, and a graphite yarn (B) having a crystallite size in a c-axis direction of greater than 100.0 Å.

4 Claims, No Drawings

RESIN COMPOSITION

CROSS REFERENCE TO RELATED APPLICATIONS

This application is a National Stage of International Application No. PCT/JP2019/019299 filed May 15, 2019, claiming priority based on Japanese Patent Application No. 2018-097928 filed May 22, 2018.

TECHNICAL FIELD

The invention relates to resin compositions.

BACKGROUND ART

Materials for sliding parts used in products such as automobiles and industrial instruments are recently highly required to have improved properties, such as weight saving, downsizing, improved abrasion resistance involved in lower fuel consumption, reduced friction, and lower friction.

Materials conventionally used for such sliding parts are resin materials containing filler in order to improve properties such as dimensional stability, creep resistance, and abrasion resistance.

For example, Patent Literature 1 discloses a pressure-resistant, sliding tetrafluoroethylene resin composition obtained by blending a modified tetrafluoroethylene resin containing a copolymer of tetrafluoroethylene and partially modified tetrafluoroethylene with carbon fiber and a granular inorganic compound.

Patent Literature 2 discloses a resin composition for a sliding part, containing (a) carbon fiber, (b) metal powder, and (c) melt-fabricable fluorine-containing resin in specific proportions.

Patent Literature 3 discloses a shaft seal material for a car air conditioner, containing a polytetrafluoroethylene composition containing: 60 to 90% by weight of modified polytetrafluoroethylene; 10 to 30% by weight of a first carbon fiber having an average fiber diameter of 5 to 30 μm and an average fiber length of 20 to 60 μm; and 1 to 10% by weight of a second carbon fiber having an average fiber diameter of 5 to 30 μm and an average fiber length of 90 to 200 μm, the first carbon fiber and the second carbon fiber each being a pitch-based carbon fiber having a random structure.

Patent Literature 4 discloses a resin molding material containing resin, a carbon substance, and an inorganic substance, the resin molding material containing an adhesive carbon substance as the carbon substance.

Patent Literature 5 discloses a heat-resistant, heat-conductive composite material containing a specific thermoplastic resin and a carbon fiber having a specific aspect ratio, having a thermal conductivity of 0.7 W/m·K or more, and satisfying the following requirements (A) to (E):

(A) the thermoplastic resin contains at least 50% by weight or more of fluororesin;

(B) the carbon fiber is a graphitized carbon fiber using mesophase pitch as a starting material;

(C) the carbon fiber has a true density of 1.7 to 2.5 g/cc;

(D) the carbon fiber contains graphite crystals having a crystallite size in the c-axis direction of 20 nm or greater and a crystallite size in the ab-axis direction of 20 nm or greater; and (E) the carbon fiber is present in the composite material in a proportion of 5 to 50% by weight.

CITATION LIST

Patent Literature

Patent Literature 1: JP 2002-128981 A
Patent Literature 2: JP H05-320455 A
Patent Literature 3: JP 2010-216612 A
Patent Literature 4: WO 2007/055338
Patent Literature 5: JP 2008-208159 A

SUMMARY OF INVENTION

Technical Problem

Conventional techniques still have room for improvement in that a material such as a seal material with a reduced abrasion coefficient unfortunately tends to scratch the surface of an article made of aluminum, which is a soft metal, when brought into contact therewith.

The invention has been made under the current situation in the art and aims to provide a resin composition having a low abrasion coefficient and a low tendency to scratch the surface of an aluminum article when brought into contact with the aluminum article.

Solution to Problem

The inventors conducted intensive studies for achieving the aim and focused on the filler to be blended with the resin composition. They thereby found that combination use of two specific kinds of graphite yarn as the filler can provide a composition that has a low abrasion coefficient and a low tendency to scratch the surface of an aluminum article when brought into contact therewith, whereby they completed the invention.

The invention relates to a resin composition containing a crystalline resin having a melting point of 290° C. or higher, a graphite yarn (A) having a crystallite size in a c-axis direction of not greater than 30.0 Å, and a graphite yarn (B) having a crystallite size in a c-axis direction of greater than 100.0 Å.

In the resin composition of the invention, the graphite yarn (A) and the graphite yarn (B) are preferably present in a total amount of 3 to 40% by mass relative to the resin composition.

The resin composition of the invention preferably contains the graphite yarn (A) and the graphite yarn (B) at a mass ratio (A/B) of 1.0/9.0 to 9.9/0.1.

The graphite yarn (A) is preferably other than a pitch-based anisotropic graphite yarn.

The graphite yarn (B) is preferably a pitch-based anisotropic graphite yarn.

The crystalline resin preferably includes at least one selected from the group consisting of a fluororesin and a polyether ketone resin.

Advantageous Effects of Invention

The resin composition of the invention has a low abrasion coefficient and a low tendency to scratch the surface of an aluminum article when brought into contact with the aluminum article.

DESCRIPTION OF EMBODIMENTS

The invention is specifically described hereinbelow.

The resin composition of the invention contains a crystalline resin having a melting point of 290° C. or higher, a graphite yarn (A) having a crystallite size in a c-axis direction of not greater than 30.0 Å, and a graphite yarn (B) having a crystallite size in a c-axis direction of greater than 100.0 Å. Having the above structure, the resin composition of the invention has a low abrasion coefficient and a low tendency to scratch the surface of an aluminum article when brought into contact with the aluminum article. Containing the crystalline resin, the resin composition can be used even at a temperature higher than 290° C.

Provision of a resin composition having a low tendency to scratch an article made of aluminum, which is soft, in spite of having a low abrasion coefficient has seemed to be difficult. On the contrary, the resin composition of the invention has the above excellent effects due to the following reasons. A graphite yarn having a small crystallite size reduces abrasion of the resin composition, while a graphite yarn having a large crystallite size improves the heat dissipation of the resin composition. Thereby, the heat generated by friction with the aluminum article is released, which presumably reduces damage on the aluminum article.

The crystalline resin preferably includes at least one resin selected from the group consisting of a fluororesin and a polyether ketone resin, more preferably a fluororesin in terms of chemical stability and chemical resistance.

Examples of the polyether ketone resin include polyether ketone, polyether ether ketone, polyether ketone ketone, and polyether ether ketone ketone.

The melting point is a value determined as a temperature corresponding to the maximum value on a heat-of-fusion curve drawn using a differential scanning calorimeter (DSC) at a temperature-increasing rate of 10° C./min.

In terms of heat resistance, the fluororesin is preferably at least one selected from the group consisting of polytetrafluoroethylene (PTFE) and tetrafluoroethylene (TFE)/perfluoro (alkyl vinyl ether) (PAVE) copolymers (PFAs). In terms of sealing properties and sliding properties, PTFE is more preferred.

The PTFE may be either a homo-PTFE consisting only of a TFE unit or a modified PTFE containing a TFE unit and a modifying monomer unit based on a modifying monomer copolymerizable with TFE.

Also, the PTFE may be either a high molecular weight PTFE having non melt-processibility and fibrillatability or a low molecular weight PTFE having melt-processibility and not having fibrillatability. Still, the PTFE is preferably a high molecular weight PTFE having non melt-processibility and fibrillatability.

The modifying monomer may be any monomer copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkyl ethylene; ethylene; and fluorine-containing vinyl ether containing a nitrile group. One modifying monomer may be used alone or two or more thereof may be used.

The perfluorovinyl ether may be, but is not limited to, an unsaturated perfluoro compound represented by the following formula (1):

  (1)

(wherein $Rf^1$ is a perfluoro organic group). The "perfluoro organic group" herein means an organic group obtainable by replacing every hydrogen atom binding to a carbon atom by a fluorine atom. The perfluoro organic group may contain ether oxygen.

An example of the perfluorovinyl ether is perfluoro(alkyl vinyl ether) (PAVE) in which $Rf^1$ in the formula (1) is a C1-C10 perfluoroalkyl group. The perfluoroalkyl group preferably has a carbon number of 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Preferred is a perfluoropropyl vinyl ether (PPVE) in which the perfluoroalkyl group is a perfluoropropyl group.

Examples of the perfluorovinyl ether further include a perfluorovinyl ether in which $Rf^1$ in the formula (1) is a C4-C9 perfluoro(alkoxy alkyl) group, a perfluorovinyl ether in which $Rf^1$ is a group represented by the following formula:

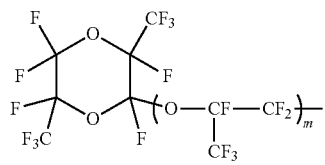

[Chem. 1]

(wherein m is 0 or an integer of 1 to 4), and a perfluorovinyl ether in which $Rf^1$ is a group represented by the following formula:

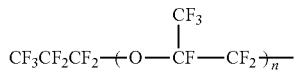

[Chem. 2]

(wherein n is an integer of 1 to 4).

Examples of the perfluoroalkyl ethylene include, but are not limited to, perfluorobutyl ethylene (PFBE), perfluorohexyl ethylene, and (perfluorooctyl)ethylene.

The fluorine-containing vinyl ether containing a nitrile group is more preferably a fluorine-containing vinyl ether represented by $CF_2=CFORf^2CN$ (wherein $Rf^2$ is a C2-C7 alkylene group optionally containing an oxygen atom between two carbon atoms).

The modifying monomer in the modified PTFE preferably includes at least one selected from the group consisting of HFP, CTFE, VDF, PPVE, PFBE, and ethylene, more preferably at least one monomer selected from the group consisting of PPVE, HFP, and CTFE.

The modified PTFE preferably contains the modifying monomer unit in the range of 0.001 to 2 mol %, more preferably in the range of 0.001 to 1 mol %.

The PTFE preferably has a melt viscosity (MV) of $1.0 \times 10$ Pa·s or more, more preferably $1.0 \times 10^2$ Pa·s or more, still more preferably $1.0 \times 10^3$ Pa·s or more.

The melt viscosity can be measured in conformity with ASTM D 1238. Specifically, a 2-g sample previously heated at a measurement temperature (380° C.) for five minutes is subjected to the measurement using a flow tester (available from Shimadzu Corporation) and a 2ϕ-8 L die at the above temperature at a load of 0.7 MPa.

The PTFE preferably has a standard specific gravity (SSG) of 2.130 to 2.230, more preferably 2.140 or more and 2.190 or less.

The standard specific gravity (SSG) herein can be measured by water displacement in conformity with ASTM D 4895-89.

The PTFE preferably has a melting point of 324° C. to 360° C. The melting point of fluororesin herein is a temperature corresponding to the maximum value on a heat-of-fusion curve drawn using a differential scanning calorimeter (DSC) at a temperature-increasing rate of 10° C./min.

The PFA is preferably, but is not limited to, a copolymer having a mole ratio between a TFE unit and a PAVE unit (TFE unit/PAVE unit) of 70/30 or higher and lower than 99/1. The mole ratio is more preferably 70/30 or higher and 98.9/1.1 or lower, still more preferably 80/20 or higher and 98.5/1.5 or lower. Too small an amount of the TFE unit tends to cause reduced mechanical properties, while too large an amount of the TFE unit tends to cause an excessively high melting point, resulting in reduced moldability. The PFA is also preferably a copolymer containing a monomer unit derived from a monomer copolymerizable with TFE and PAVE in an amount of 0.1 to 10 mol % and a TFE unit and a PAVE unit in a total amount of 90 to 99.9 mol %. Examples of the monomer copolymerizable with TFE and PAVE include HFP, a vinyl monomer represented by $CZ^3Z^4=CZ^5(CF_2)nZ^6$ (wherein $Z^3$, $Z^4$, and $Z^5$ are the same as or different from each other and are each a hydrogen atom or a fluorine atom; $Z^6$ is a hydrogen atom, a fluorine atom, or a chlorine atom; and n is an integer of 2 to 10), and an alkyl perfluorovinyl ether derivative represented by $CF_2=CF-OCH_2-Rf^7$ (wherein $Rf^7$ is a C1-C5 perfluoro alkyl group).

The PFA preferably has a melting point of 290° C. to 340° C., more preferably 295° C. to 330° C.

The PFA preferably has a melt flow rate (MFR) of 0.1 to 100 g/10 min, more preferably 0.5 to 90 g/10 min, still more preferably 1.0 to 85 g/10 min.

The MFR herein is a value measured in conformity with ASTM D1238 at 372° C. at a load of 5 kg.

The PFA preferably has a standard specific gravity of 2.12 to 2.18.

The amount of each monomer unit constituting the fluororesin herein can be calculated by appropriately combining NMR, FT-IR, elemental analysis, and X-ray fluorescence analysis in accordance with the type of the monomer.

The graphite yarn (A) has a crystallite size in the c-axis direction of not greater than 30.0 Å. Combination use of the graphite yarn (A) and the graphite yarn (B) having specific crystallite sizes allows the resin composition to have a low tendency to scratch the surface of an aluminum article when brought into contact with the aluminum article in spite of having a low abrasion coefficient. The crystallite size in the c-axis direction of the graphite yarn (A) is preferably not greater than 28.5 Å, more preferably not greater than 28.0 Å, still more preferably not greater than 27.0 Å, particularly preferably not greater than 25.0 Å. The crystallite size in the c-axis direction of the graphite yarn (A) is also preferably not greater than 23.0 Å, more preferably not greater than 20.0 Å, in terms of abrasion resistance in combination use with the graphite yarn (B). The lower limit of the crystallite size in the c-axis direction may be, but is not limited to, 10.0 Å, for example.

The crystallite size in the c-axis direction is determined by the Gakushin method in which an X-ray diffractometer is used to measure the reflection from the (002) plane appearing in X-ray diffraction.

Specifically, the crystallite size in the c-axis direction is determined by the Gakushin method as follows. X-ray diffraction analysis is performed with an X-ray diffractometer (Rigaku, Ultima III) by packing the measurement substance flat in a recess of a quartz sample holder, setting the X-ray source to Cu—Kα rays and the output to 40 kV and 20 mA, and measuring the reflection from the (002) plane appearing in the X-ray diffraction. Then, the crystallite size is determined.

The graphite yarn (A) is preferably other than a pitch-based anisotropic graphite yarn. A graphite yarn (A) that is other than a pitch-based anisotropic graphite yarn allows the resin composition to have a low abrasion coefficient. Examples of the graphite yarn other than a pitch-based anisotropic graphite yarn include a pitch-based isotropic graphite yarn, a pitch-based isotropic carbon yarn, a PAN-based carbon yarn, and a PAN-based graphite yarn. More preferred among these is a pitch-based isotropic graphite yarn although not being limited thereto.

In terms of maintenance of mechanical strength and mixability with resin, the graphite yarn (A) preferably has an average fiber length of 5 to 1000 μm, more preferably 5 to 500 μm, still more preferably 5 to 300 μm.

The average fiber length is determined by photographing an image of fibers at a magnification of 200× in each of randomly selected ten fields of view with a scanning electron microscope, measuring the fiber lengths of 200 fibers, and calculating the number average fiber length.

In terms of maintenance of mechanical strength and mixability with resin, the graphite yarn (A) preferably has an average fiber diameter of 1 to 25 μm, more preferably 1 to 20 μm, still more preferably 5 to 20 μm.

The average fiber diameter is determined by photographing an image of fibers at a magnification of 200× in each of randomly selected ten fields of view with a scanning electron microscope, measuring the fiber lengths of 200 fibers, and determining the number average fiber diameter.

The half width of the diffraction peak of the (002) plane of the graphite yarn (A) observed by X-ray diffraction and the half width of the diffraction peak of the (111) plane of standard silicon (NBS, 640) observed by X-ray diffraction under the same conditions preferably give a half width ratio (graphite yarn)/(standard silicon) of 10 or higher, more preferably 12 or higher. A half width ratio within the above range can provide a resin composition having a low tendency to scratch the surface of an aluminum article when brought into contact with the aluminum article in spite of having a low abrasion coefficient.

The upper limit of the half width ratio may be, but is not limited to, 100, for example.

The X-ray diffraction analysis is performed by the same method as for the measurement of the crystallite size in the c-axis direction.

In terms of the abrasion resistance, the graphite yarn (A) preferably has a specific gravity of 1.3 or more and less than 2.0, more preferably 1.4 to 1.9. The specific gravity can be determined in accordance with the butanol substitution method (JIS R 7222).

Examples of the graphite yarn (A) include Kreca Chop M2007S (crystallite size: 16.5 Å), M-201S (crystallite size: 17.4 Å), M-207S, M-1009S, and M-101S available from Kureha Corporation, Donacarbo SC249 (crystallite size: 13.9 Å), SG-249 (crystallite size: 17.6 Å), SC-2404N (crystallite size: 13.9 Å), and SG-2404N (crystallite size: 20.1 Å) available from Osaka Gas Chemicals Co., Ltd., Tenax HTC443 6 MM (crystallite size: 14.1 Å), HTM800 160 mu, and HTM100 40 mu available from Toho Tenax, and MLD available from Toray Industries, Inc.

The graphite yarn (B) has a crystallite size in the c-axis direction of greater than 100.0 Å. Combination use of the graphite yarn (A) and the graphite yarn (B) having specific crystallite sizes allows the resin composition of the invention to have a low tendency to scratch the surface of an aluminum article when brought into contact with the aluminum article in spite of having a low abrasion coefficient. The crystallite size in the c-axis direction of the graphite yarn (B) is preferably 120.0 Å or greater, more preferably 140.0 Å or greater. The upper limit of the crystallite size in the c-axis direction may be, but is not limited to, 500.0 Å, for example. The crystallite size in the c-axis direction is determined by the same method as for the graphite yarn (A).

The graphite yarn (B) is preferably a pitch-based anisotropic graphite yarn. A graphite yarn (B) that is a pitch-based anisotropic graphite yarn allows the resin composition to have a low tendency to scratch the surface of an aluminum article when brought into contact with the aluminum article.

The half width of the diffraction peak of the (002) plane of the graphite yarn (B) observed by X-ray diffraction and the half width of the diffraction peak of the (111) plane of standard silicon observed by X-ray diffraction under the same conditions preferably give a half width ratio (graphite yarn)/(standard silicon) of lower than 10, more preferably 7 or lower.

The lower limit of the half width ratio may be, but is not limited to, 1, for example.

The X-ray diffraction analysis is performed by the same method as for the measurement of the crystal size in the c-axis direction.

In terms of maintenance of mechanical strength and mixability with resin, the graphite yarn (B) preferably has an average fiber length of 5 to 1000 μm, more preferably 5 to 500 μm, still more preferably 5 to 300 μm.

The average fiber length was determined by photographing an image of fibers at a magnification of 200× in each of randomly selected ten fields of view with a scanning electron microscope, measuring the fiber lengths of 200 fibers, and calculating the number average fiber length.

In terms of maintenance of mechanical strength and mixability with resin, the graphite yarn (B) preferably has an average fiber diameter of 1 to 25 μm, more preferably 1 to 20 μm, still more preferably 5 to 20 μm.

The average fiber diameter was determined by photographing an image of fibers at a magnification of 200× in each of randomly selected ten fields of view with a scanning electron microscope, measuring the fiber diameters of 200 fibers, and calculating the number average fiber diameter.

In terms of aggressiveness to opposite material, the graphite yarn (B) preferably has a specific gravity of 2.0 to 2.4, more preferably 2.0 to 2.3.

The specific gravity can be determined in accordance with the butanol substitution method (JIS R 7222).

Examples of the graphite yarn (B) include XN-100-05M (crystallite size: 234.0 Å), XN-100-10M, XN-100-15M (crystallite size: 243.8 Å), HC-600-15M (crystallite size: 230.7 Å), and ZY-300-15M (crystallite size: 312.9 Å) available from Nippon Graphite Fiber Corporation, and K223HM (crystallite size: 211.0 Å) and K6371M (crystallite size: 130.6 Å) available from Mitsubishi Rayon Co., Ltd.

In the resin composition of the invention, the graphite yarn (A) and the graphite yarn (B) are preferably present in a total amount of 3 to 40% by mass relative to the resin composition. Less than 3% by mass in total thereof may cause a failure in exerting the filling effect of filler, while more than 40% by mass in total thereof tends to cause significantly reduced mechanical properties.

The resin composition of the invention preferably contains the graphite yarn (A) and the graphite yarn (B) at a mass ratio (A/B) of 1.0/9.0 to 9.9/0.1, more preferably 3.0/7.0 to 9.9/0.1. A mass ratio (A/B) of 3.0/7.0 or higher can cause further improved abrasion resistance. This improvement is presumably achieved by controlling the filling amount of the graphite yarn (B) which has a high abrasion coefficient and heat dissipation and which has a crystallite size in the c-axis direction of greater than 100.0 Å.

In terms of excellent abrasion resistance, the mass ratio (A/B) is preferably 7.0/3.0 to 9.9/0.1, more preferably 7.5/2.5 to 9.9/0.1, still more preferably 8.0/2.0 to 9.9/0.1, further more preferably 9.0/1.0 to 9.9/0.1. Even a mass ratio (A/B) of 9.5/0.5 to 9.9/0.1, which means a low proportion of the graphite yarn (B), can achieve much better abrasion coefficient.

In terms of the balance between the abrasion coefficient and the influence on opposite material, the mass ratio (A/B) is also preferably 5.0/5.0 to 1.0/9.0, more preferably 5.0/5.0 to 3.0/7.0.

The resin composition of the invention preferably contains the graphite yarn (A) that is other than a pitch-based anisotropic graphite yarn and the graphite yarn (B) that is a pitch-based anisotropic graphite yarn. Combination use of a graphite yarn other than a pitch-based anisotropic graphite yarn and a pitch-based anisotropic graphite yarn can provide a resin composition having a low tendency to scratch the surface of an aluminum article when in contact with the aluminum article in spite of having a low abrasion coefficient.

The resin composition of the invention may consist only of heat-resistant resin, the graphite yarn (A), and the graphite yarn (B), or may further contain a different component in addition to the heat-resistant resin, the graphite yarn (A), and the graphite yarn (B) according to need. The different component may be a combination of various additives such as metal, inorganic or organic reinforcing fillers and compatibilizers, lubricants (carbon fluoride, carbon graphite, molybdenum disulfide), and stabilizers.

The amount of the different component is preferably 50% by mass or less, more preferably 40% by mass or less, of the resin composition.

The resin composition of the invention can be produced by a known method. For example, the resin composition is obtainable by mixing heat-resistant resin, the graphite yarn (A), the graphite yarn (B), and, if needed, a different component with a blending machine such as a V-shape blender, a tumbler, a henschel mixer, a ball mixer, or a Loedige mixer. Furthermore, the obtained mixture may be kneaded with a melt-kneading device such as a uniaxial extruder or a biaxial extruder and then pelletized. The resin composition may also be produced by adding the graphite yarn (A) and the graphite yarn (B) to the heat-resistant resin under a melting process in the melt-kneading device.

The resin composition of the invention have excellent sliding properties and thus may be used as a sliding material usable in high-temperature, highly exothermic environments. Examples of a product including a sliding material include various gears, bearings for sliding friction systems and rolling friction systems, bearings, brakes, clutch parts, piston rings, and various sealing materials. Suitable applications include sealing rings for various hydraulic instruments such as automatic transmission and continuously variable transmission of automobiles. In other words, the invention also relates to a sealing ring obtainable by molding the resin composition. The sealing ring is particularly preferably a sealing ring used in contact with an aluminum article. The sealing ring is particularly useful as a sealing ring for automobiles, especially as a sealing ring for automatic transmission of automobiles.

The sealing ring can be molded by a typical method that is appropriate for the components to be used, such as the heat-resistant resin. Examples of the molding method include injection molding, extrusion molding, and compression molding.

In the case of using PTFE as a heat-resistant resin, a desired molded article (e.g. sealing ring) may be obtained by mixing PTFE, the graphite yarn (A), and the graphite yarn (B) with the blending machine to provide a resin composition, molding the resin composition by a molding method such as compression molding, baking the molded workpiece at 350° C. to 380° C. for 0.5 to 10 hours, and processing the baked workpiece by a technique such as cutting.

The resin composition can also be used as seals (tip seals, piston rings) for compressors containing gas such as carbon dioxide, natural gas, freon substitute, air, or helium gas; high water pressure seals for tall construction; sealing rings for power steering of vehicles such as trucks, buses, and automobiles; and seal bearings of construction machines such as loading shovels, forklifts, bulldozers, and nail guns.

EXAMPLES

The invention is described with reference to experimental examples, but the experimental examples are not intended to limit the invention.

Material compounds used in the experimental examples are described.

(1) Base Polymer (Heat-Resistant Resin)

polytetrafluoroethylene (PTFE), trade name: Polyflon M-18F, available from Daikin Industries, Ltd., standard specific gravity (SSG): 2.164, melting point: 344.9° C.

(2) Pitch-Based Anisotropic Graphite Yarn trade name: GRANOC, grade: XN-100-15M, available from Nippon Graphite Fiber Corporation, half width ratio to standard silicon: 3, crystallite size in the c-axis direction: 244 Å

(3) Pitch-Based Isotropic Graphite Yarn trade name: Kreca Chop, grade: M2007S, available from Kureha Corporation, half width ratio to standard silicon: 46, crystallite size in the c-axis direction: 17 Å

The SSG and the melting point of the PTFE and the half width ratio to standard silicon and the crystallite size in the c-axis direction of the graphite yarn (A) and the graphite yarn (B) are values determined by the aforementioned methods.

The properties evaluated in the experimental examples were determined as follows.

Abrasion Coefficient

The resin composition of each of Examples 1 to 9 and Comparative Examples 1 and 2 in an amount of 80 g was press-molded at a molding pressure of 68.6 MPa and then baked at 370° C., whereby a cylindrical molded article (external diameter 30 mm, height 50 mm) was provided. This molded article was cut into a specimen (external diameter 25.6 mm, internal diameter 20 mm, height 15 mm) for abrasion coefficient determination, and the specimen was subjected to a friction abrasion test with a friction abrasion tester MODEL EFM-III-F/ADX available from Orientec Co., Ltd. under the following conditions.

load: 0.45 MPa
speed: 1.0 m/s
temperature: room temperature
opposite material: aluminum alloy die cast ADC12
surface roughness of opposite material: Ra 0.6 μm The abrasion coefficient was calculated from the weight change of the specimen before and after the test.

Surface Roughness Change (%) of Opposite Material

The surface roughness change of opposite material was calculated according to the following equation with the surface roughness of the sliding surface of the opposite material before the friction abrasion test (Ra before test) and the surface roughness of the sliding surface of the opposite material after the test (Ra after test).

Surface roughness change (%) of opposite material= (Ra after test–Ra before test)×100/Ra before test The surface roughness of the sliding surface of the opposite material after the test was determined by heating the opposite material after the test in an electric furnace at 410° C. for three hours, leaving the opposite material to cool in a desiccator for two hours, and measuring the surface roughness of the sliding surface of the opposite material with a surface roughness tester SURFTEST SV-600 available from Mitutoyo Corporation in accordance with JIS B 0601-1994.

Comparative Example 1

Polytetrafluoroethylene resin powder (Polyflon PTFE M-18F, available from Daikin Industries, Ltd.) obtained by suspension polymerization in an amount of 90 parts by mass and, as filler, a pitch-based anisotropic graphite yarn (GRANOC XN-100-15M, available from Nippon Graphite Fiber Corporation) in an amount of 10 parts by mass were mixed with a henschel mixer, whereby a polytetrafluoroethylene composition was obtained.

Example 1

Polytetrafluoroethylene resin powder (Polyflon PTFE M-18F, available from Daikin Industries, Ltd.) obtained by suspension polymerization in an amount of 90 parts by mass and, as filler, a pitch-based anisotropic graphite yarn (GRANOC XN-100-15M, available from Nippon Graphite Fiber Corporation) in an amount of 9 parts by mass and a pitch-based isotropic graphite yarn (Kreca Chop M2007S, available from Kureha Corporation) in an amount of 1 part by mass were mixed with a henschel mixer, whereby a polytetrafluoroethylene composition was obtained.

Example 2 to Example 9

Components in amounts shown in Table 1 were mixed as in Example 1.

Comparative Example 2

Polytetrafluoroethylene resin powder (Polyflon PTFE M-18F, available from Daikin Industries, Ltd.) obtained by suspension polymerization in an amount of 90 parts by mass and, as filler, a pitch-based isotropic graphite yarn (Kreca Chop M2007S, available from Kureha Corporation) in an amount of 10 parts by mass were mixed with a henschel mixer, whereby a polytetrafluoroethylene composition was obtained.

TABLE 1

|  | Comparative Example 1 | Example 1 | Example 2 | Example 3 | Example 4 | Example 5 | Example 6 | Example 7 | Example 8 | Comparative Example 2 | Example 9 |
|---|---|---|---|---|---|---|---|---|---|---|---|
| Base polymer | M-18F | M-18F | M-18F | M-18F | M-18F | M-18F | M-18F | M-18F | M-18F | M-18F | M-18F |
| Pitch-based anisotropic graphite yarn (wt %) [XN-100-15M] | 10 | 9 | 7 | 5 | 3 | 1 | 0.7 | 0.5 | 0.1 | — | 1 |
| Pitch-based isotropic graphite yarn (wt %) [M2007S] | — | 1 | 3 | 5 | 7 | 9 | 9.3 | 9.5 | 9.9 | 10 | 19 |
| Abrasion coefficient ((mm/km)/MPa) | $3.0 \times 10^{-4}$ | $1.3 \times 10^{-4}$ | $4.1 \times 10^{-5}$ | $6.3 \times 10^{-5}$ | $1.7 \times 10^{-5}$ | $1.8 \times 10^{-5}$ | $1.6 \times 10^{-5}$ | $1.0 \times 10^{-5}$ | $6.2 \times 10^{-6}$ | $7.5 \times 10^{-5}$ | $8.6 \times 10^{-6}$ |
| Surface roughness change of opposite material (%) | 16 | 16 | 16 | 16 | 16 | 33 | 33 | 33 | 33 | 33 | 41 |

The results of Examples 1 to 9 demonstrate that combination use of a graphite yarn having a crystallite size in the c-axis direction of not greater than 30.0 Å and a graphite yarn having a crystallite size in the c-axis direction of greater than 100.0 Å can provide a molded article having a low abrasion coefficient and a low tendency to scratch the surface of an aluminum article when brought into contact with the aluminum article.

For example, in Examples 1 to 4, the abrasion coefficient was lower than that in Comparative Example 1 without an increase in the surface roughness change of opposite material.

In Examples 5 to 8, the surface roughness change of opposite material was similar to that in Comparative Example 2, but the resulting molded article had a lower abrasion coefficient than in both Comparative Example 1 and Comparative Example 2. This means that a desired effect was sufficiently exerted by combination use of a graphite yarn having a crystallite size in the c-axis direction of not greater than 30.0 Å and a graphite yarn having a crystallite size in the c-axis direction of greater than 100.0 Å.

The invention claimed is:

1. A resin composition comprising:
   a crystalline resin having a melting point of 290° C. or higher;
   a graphite yarn (A) having a crystallite size in a c-axis direction of not greater than 30.0 Å; and
   a graphite yarn (B) having a crystallite size in a c-axis direction of greater than 100.0 Å,
   wherein the graphite yarn (A) is a pitch-based isotropic graphite yarn, a pitch-based isotropic carbon yarn, a PAN-based carbon yarn, or a PAN-based graphite yarn,
   wherein the graphite yarn (B) is a pitch-based anisotropic graphite yarn.

2. The resin composition according to claim 1,
   wherein the graphite yarn (A) and the graphite yarn (B) are present in a total amount of 3 to 40% by mass relative to the resin composition.

3. The resin composition according to claim 1,
   wherein the resin composition contains the graphite yarn (A) and the graphite yarn (B) at a mass ratio (A/B) of 1.0/9.0 to 9.9/0.1.

4. The resin composition according to claim 1,
   wherein the crystalline resin is at least one selected from the group consisting of a fluororesin and a polyether ketone resin.

* * * * *